(12) United States Patent
Lee et al.

(10) Patent No.: US 6,614,477 B1
(45) Date of Patent: Sep. 2, 2003

(54) METHODS AND APPARATUS FOR VARIABLE FRAME RATE IMAGE CAPTURE

(75) Inventors: Cheol-kyoo Lee, Seoul (KR); Sung-chan Oh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/187,246

(22) Filed: Nov. 6, 1998

(30) Foreign Application Priority Data

Nov. 11, 1997 (KR) ........................................ 1997-59284

(51) Int. Cl.[7] ........................ H04N 5/335; H04N 5/235
(52) U.S. Cl. ........................ 348/312; 348/296; 348/322; 348/362
(58) Field of Search ................................ 348/312, 296, 348/317, 318, 319, 322, 362, 14.01, 14.08

(56) References Cited

U.S. PATENT DOCUMENTS

| | | | |
|---|---|---|---|
| 4,057,830 A | * 11/1977 | Adcock | 348/117 |
| 4,096,530 A | * 6/1978 | Plugge et al. | 348/547 |
| 4,890,165 A | * 12/1989 | Hasegawa | 348/312 |
| 5,019,906 A | * 5/1991 | Wesolowski | 348/497 |
| 5,247,367 A | 9/1993 | Lee | 358/213.19 |
| 5,335,013 A | * 8/1994 | Faber | 348/104 |
| 5,422,670 A | 6/1995 | Fukui | 348/296 |
| 5,450,129 A | * 9/1995 | Matoba et al. | 348/312 |
| 5,748,234 A | * 5/1998 | Lippincott | 348/222.1 |
| 5,786,851 A | * 7/1998 | Kondo et al. | 348/222 |
| 6,137,920 A | * 10/2000 | Mead | 382/294 |
| 6,259,478 B1 | * 7/2001 | Hori | 348/296 |
| 6,285,399 B1 | * 9/2001 | Tao | 348/312 |
| 6,359,654 B1 | * 3/2002 | Glennon et al. | 348/448 |

OTHER PUBLICATIONS

"An Introduction to Scientific Imaging Charge–Coupled Devices," Scientific Imaging Technologies, Inc., Beaverton, Oregon, 1994.

* cited by examiner

Primary Examiner—Wendy R. Garber
Assistant Examiner—Lin Ye
(74) Attorney, Agent, or Firm—Myers Bigel Sibley & Sajovec

(57) ABSTRACT

Image capture data is output from an image capture device, e.g., a CCD, at a commanded frame rate. A succession of fields that occur at a field rate are identified. A commanded frame rate that is less than or equal to the field rate is received. Read signals are applied to the image capture device for selected fields of the succession of fields to thereby output image data at the commanded frame rate. The image capture device is shuttered for a shutter interval based on the commanded frame rate to prevent image capture during the shutter interval. According to aspects of the invention, the commanded frame rate is selected such that the field rate is an integer multiple of the commanded frame rate. An image capture apparatus according to the present invention includes an image capture device configured to receive read signals and operative to output image data responsive thereto. A timing generator is operative to produce a timing signal that define a succession of fields that occur at a field rate. A variable frame rate image capture controller is coupled to the timing generator, configured to receive a commanded frame rate, and operative to apply read signals to the image capture device for selected fields of the succession of fields to thereby output image data from the image capture device at the commanded frame rate, and to shutter the image capture device during a shutter interval determined based on the commanded frame rate.

23 Claims, 5 Drawing Sheets

METHODS AND APPARATUS FOR VARIABLE FRAME RATE IMAGE CAPTURE

FIELD OF THE INVENTION

The present invention relates to imaging apparatus and methods, and more particularly, to image capture apparatus and methods of operation therefor.

BACKGROUND OF THE INVENTION

There has been tremendous growth in multimedia applications for personal computers. For example, many types of peripheral multimedia devices for processing video and audio data are now available for use with personal computers, including video devices that capture image data for further processing by a personal computer. The image data may represent a still image or a sequence of images.

In a typical solid-state image capture device such as a charge-coupled device (CCD), an array of image capture elements receive an optical signal, i.e., light radiating from an object, and store an amount of charge corresponding to the received optical signal. Vertical and horizontal transfer units output video signals corresponding to the stored charge according to horizontal and vertical period signals. A timing signal generator typically generates various signals related to operation of the image capture device, such that the video signals are output by the two-dimensional solid-state imaging device for each of a succession of "fields," such as the 1/60 second fields defined under the NTSC (National Television Standards Committee) standard and 1/50 second fields defined under the PAL (Phase Alternating Line) standard. A "frame" typically represents a time interleaving of two fields. Accordingly, a frame is typically produced every 1/30 sec for NTSC systems and every 1/25 sec for PAL systems.

Referring to FIG. 1, video data is output from a image capture device such as a CCD every 1/60 sec for NTSC and 1/50 sec for PAL. A vertical drive signal VD operates as a reference for the read operation, and signals XSG1 and XSG2 represent gate signals for transferring charge from the image capture device to a vertical transfer unit. Charge previously transferred to the vertical transfer unit is then transferred to a horizontal transfer unit line by line, and a video signal corresponding to the output image data is produced by the horizontal transfer unit. To provide exposure control, a shutter pulse is provided to discharge image capture elements in the CCD for a shutter interval to control a charging period of the image capture elements of the device. These and other basic operations of image capture devices are well-known to those skilled in the art.

In conventional systems, video data produced by such an image capture device may be processed at various rates. For example, some applications process video signals at rates that vary from 7.5 frames per second to 30 frames per second. Because data is typically read out from the image capture device at a fixed field rate, a buffer is typically used to store fields of video data read from an image capture device so that they may be processed at variable frame rates.

SUMMARY OF THE INVENTION

In light of the foregoing, it is an object of the present invention to provide an image capture apparatus and methods for operating an image capture device at varying frame rates.

It is a another object of the present invention to provide an image capture apparatus and methods that capture image data at varying frame rates without requiring buffering.

These and other objects, features and advantages are provided according to the present invention by applying gate signals to an image capture device for selected fields of a succession of fields responsive to a commanded frame rate, and shuttering the image capture device responsive to the commanded frame rate. Preferably, the commanded frame rate is selected such that the field rate is an integer multiple of the commanded frame rate. In one embodiment, gate signals are generated for each of a succession of fields, but are only applied in selected fields based on the commanded frame rate through the action of a gate enable signal.

In particular, according to the present invention, image capture data is output from an image capture device, e.g., a CCD, at a commanded frame rate. A succession of fields that occur at a field rate are identified. A commanded frame rate that is less than or equal to the field rate is received. Read signals are applied to the image capture device for selected fields of the succession of fields to thereby output image data at the commanded frame rate. The image capture device is shuttered for a shutter interval based on the commanded frame rate to prevent image capture during the shutter interval.

According to aspects of the present invention, the commanded frame is selected such that the field rate is an integer multiple of the commanded frame rate. In one embodiment application of read signals to the image capture device is preceded by the step of generating a count of fields. Read signals are applied to the image capture device responsive to the count of fields meeting a criterion related to the commanded frame rate, e.g., to the count of field equaling the number of fields in a frame corresponding to the commanded frame rate.

In another embodiment, a read signal is generated for each of the succession of fields. The generated read signals for selected fields are applied to the image capture device through, for example, the action of a gate enable signal that is generated based on the commanded frame rate.

An image capture apparatus according to the present invention includes an image capture device, e.g., a CCD, configured to receive read signals and operative to output image data responsive thereto. A timing generator is operative to produce a timing signal that defines a succession of fields that occur at a field rate. A variable frame rate image capture controller is coupled to the timing generator, configured to receive a commanded frame rate, and operative to apply read signals to the image capture device for selected fields of the succession of fields to thereby output image data from the image capture device at the commanded frame rate, and to shutter the image capture device during a shutter interval determined based on the commanded frame rate.

DETAILED DESCRIPTION OF EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices.

According to aspects of the present invention, gate signals are applied to an image capture device based on a commanded frame rate to capture image data at the selected frame rate. The image capture device is shuttered for a shutter interval based on the selected frame rate, as well as on other factors such as exposure parameters.

Figure 1:
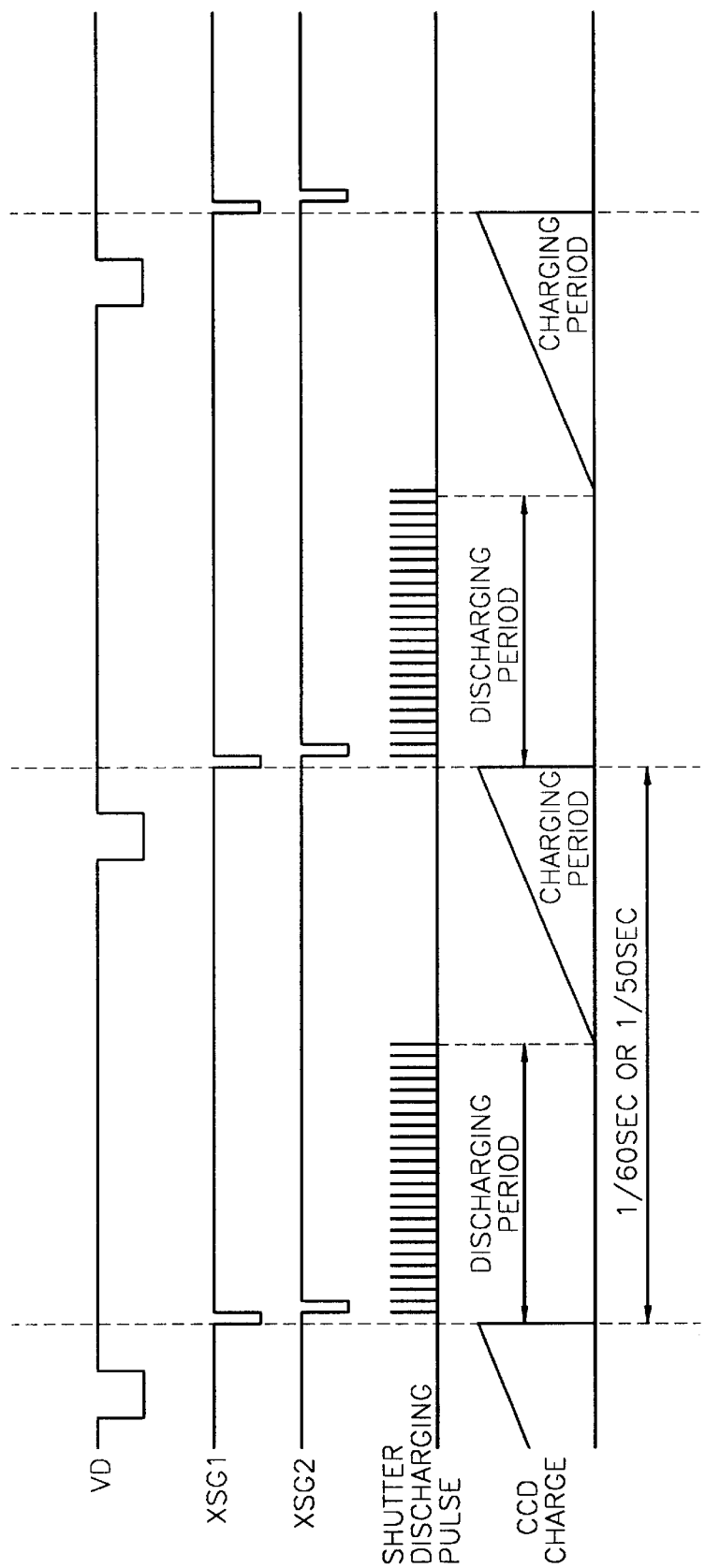
FIG. 1 is a timing diagram illustrating exemplary image capture device operations for a conventional imaging capture system.
Figure 2:
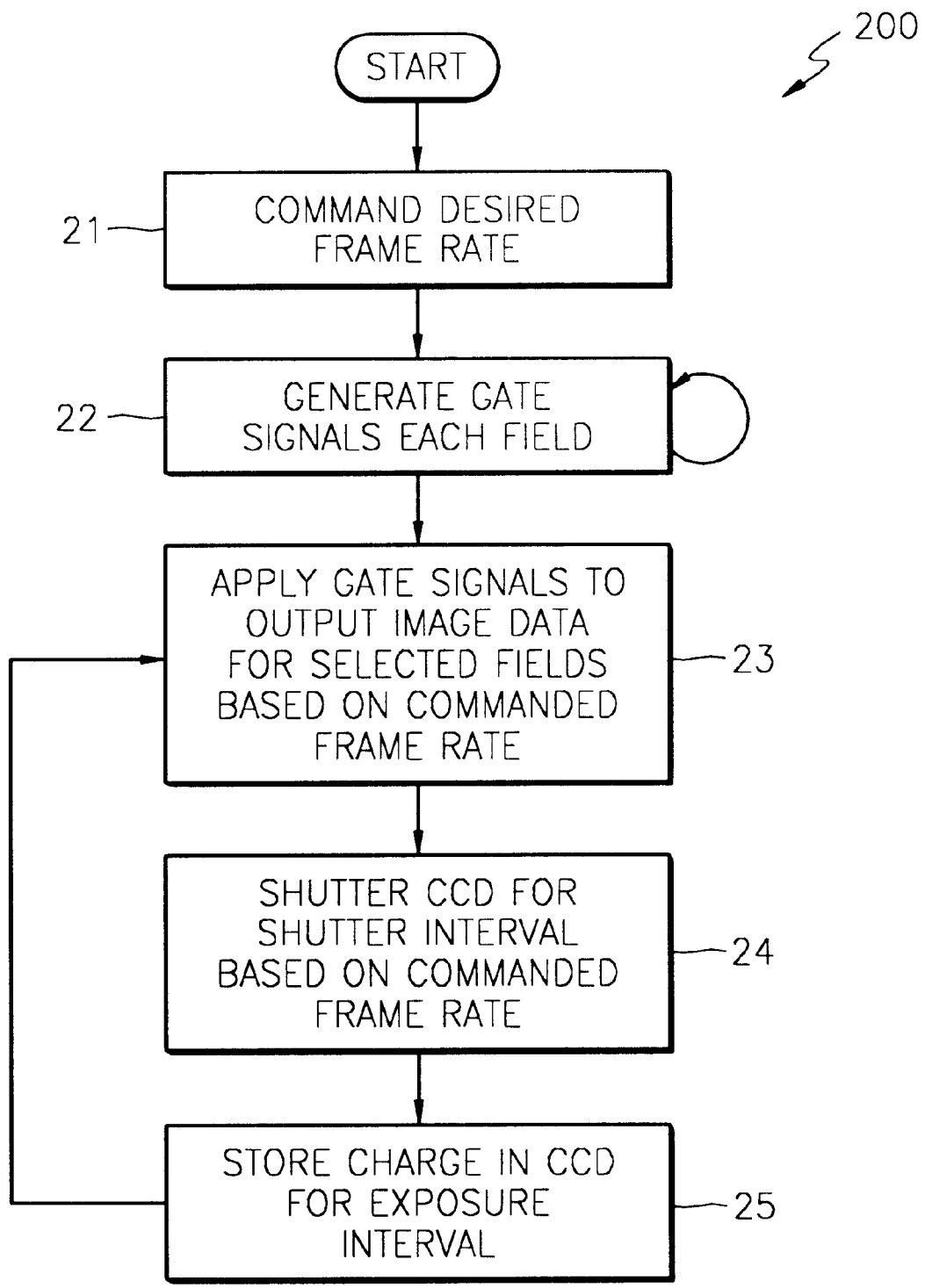
FIG. 2 is a flowchart illustrating exemplary operations for reading image data from an image capture device according to aspects of the present invention.

FIG. 2 illustrates exemplary operations 200 for producing image data from an image capture device such as a charge-coupled device (CCD). A desired frame rate is commanded (Block 21), preferably a frame rate selected such that the field rate represents an integer multiple of the desired frame rate. For example, in a NTSC compliant system having a field rate of 60 fields per second, a frame rate of 7.5, 10, 12, 15 or 20 frames per second is selected, while for a PAL compliant system having a field rate of 50 fields per second, a frame rate of 6.5, 8, 10, 12.5 or 16 frames per second is chosen.

Gate signals are generated for each field of a succession of fields, e.g., during each of a succession of $1/60^{th}$ second intervals for NTSC or $1/50^{th}$ second intervals for PAL (Block 22). Generated gate signals for selected fields are applied to the image capture device based on the commanded frame rate to output image data at the commanded frame rate (Block 23). The image capture device is then shuttered for a shutter interval based on the commanded frame rate, as well as on other parameters such as object illuminance and the like (Block 24). After the shutter interval lapses, charge is stored in the image capture device to capture new image data (Block 25), which is then output when gate signals are again applied to the image capture device (Block 23)

Figure 3:
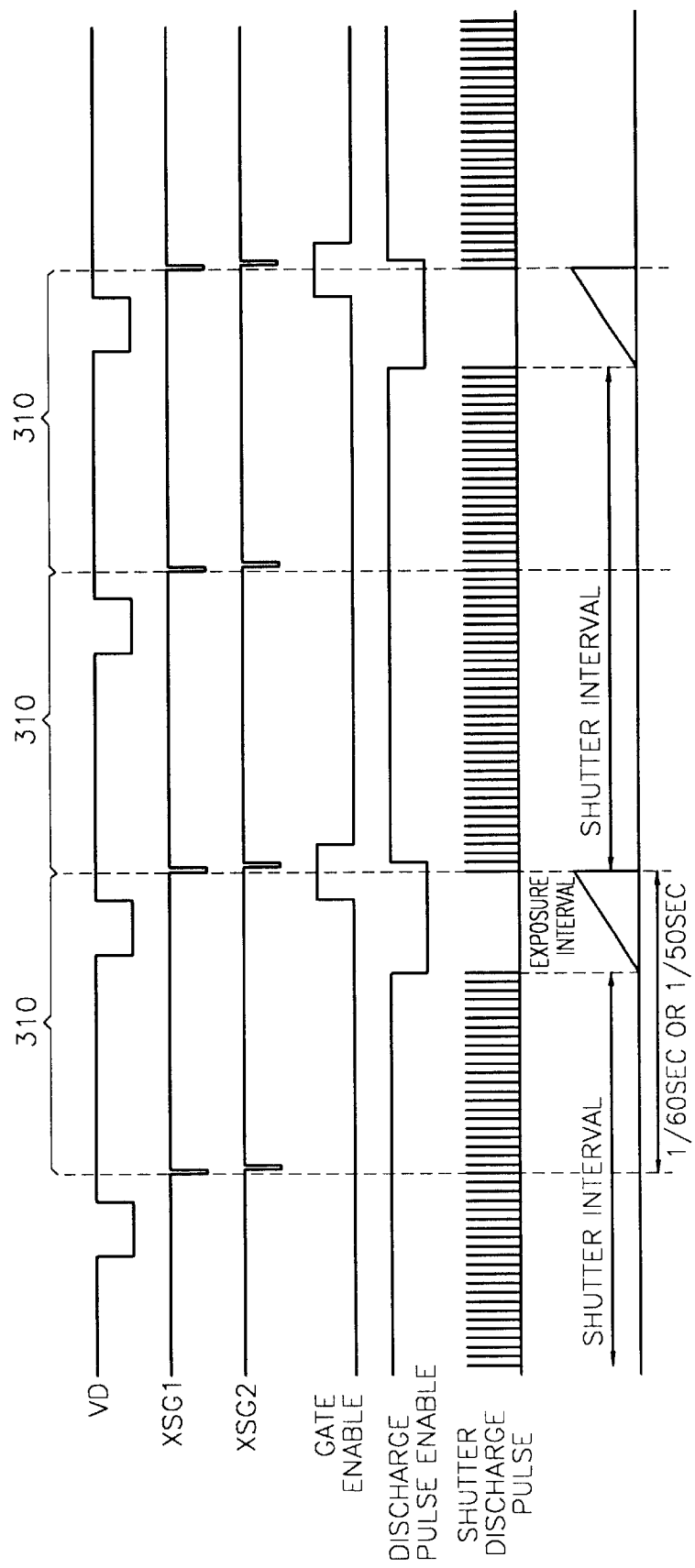
FIG. 3 is a timing diagram illustrating operations for reading image data from an image capture device according to aspects of the present invention.

Exemplary timing for image data generation according to aspects of the present invention is illustrated in FIG. 3. In each of a succession of fields 310 defined by a vertical drive signal VD, gate signals XSG1, XSG2 are generated. As illustrated, the vertical drive signal VD exhibits a pulse each $1/60^{th}$ of a second for NTSC compatible operation, or each $1/50^{th}$ of a second for PAL compatible operation. For the illustrated embodiment, the gate signals XSG1, XSG2 are applied to the image capture device under the control of a gate enable signal GATE ENABLE, such that gate signals XSG1, XSG2 are applied to the image capture device for every other field 310 responsive to a commanded frame rate, e.g., 30 frames per second for NTSC and 25 frames per second for PAL. Accordingly, image data captured by the image capture device is read out at the commanded frame rate.

A shutter discharge pulse signal SHUTTER DISCHARGE PULSE is applied to the image capture device for a shutter interval that is determined based on the commanded frame rate, as well as on other exposure parameters. During the shutter interval, the image capture elements of the image capture device are discharged, preventing image capture until the start of an exposure interval. For the illustrated embodiment, the shutter discharge pulse signal SHUTTER DISCHARGE PULSE is generated by gating a pulse train with a discharge pulse enable signal DISCHARGE PULSE ENABLE.

Figure 4:
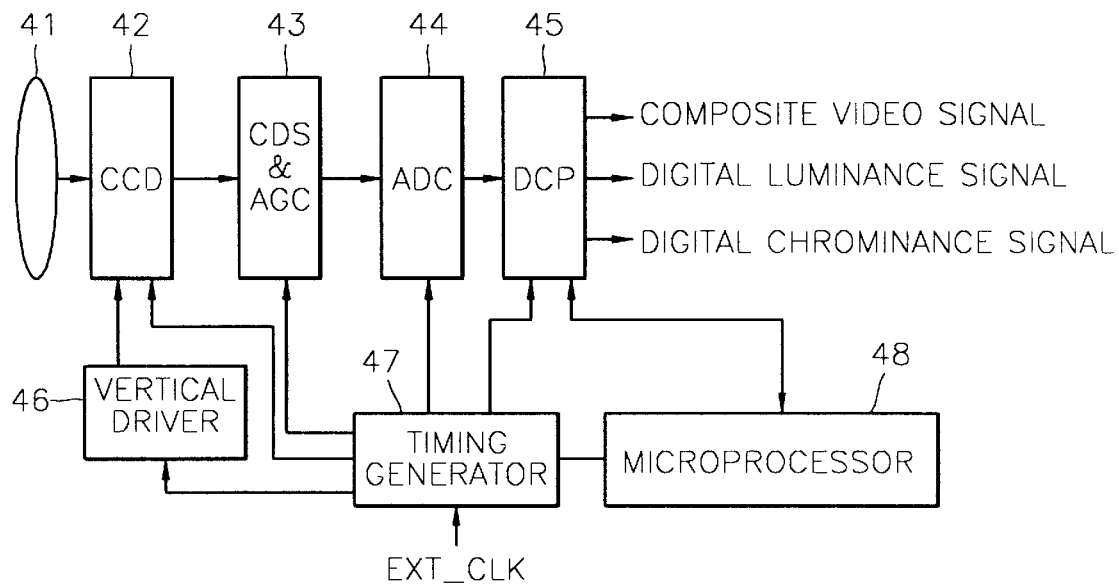
FIG. 4 is a block diagram of a camera system according to an embodiment of the present invention.

FIG. 4 illustrates an exemplary camera system 400 in which the operations of FIGS. 2 and 3 may be practiced. The camera system 400 includes an image capture device 42, such as a CCD array, that receives optical signals through a lens 41, stores charge corresponding to the input optical signals, and produces image data therefrom. A correlated double sampling and automatic gain controller (CDS & AGC) 43 performs correlated double sampling based on the image data and a precharge level, and generates analog signals having a level depending on the luminance information in the received optical signals in order to extract video components from the image data produced by the image capture device 42. An analog-to-digital converter (ADC) 44 converts the analog signals to digital video signals, and a digital camera processor (DCP) 45 processes the digital video signals to generate composite video, digital luminance and digital chrominance signals. A vertical driver 46 applies tri-statable signals for transferring charge stored in the image capture elements, e.g., photo diodes, of the image capture device 42 to a vertical transfer unit of the image capture device 42, responsive to gate signals produced by a timing generator 47. A microprocessor 48 controls operation of various components of the camera system 400.

The timing generator 47 generates various timing signals for operation of the camera system 400. The timing generator 47 divides a received clock signal EXT_CLK to generate a system clock. The timing generator 47 generates, with reference to the system clock, control signals such as a vertical drive signal that defines a succession of fields, signals for a horizontal transfer unit of the image capture device 42, a reset gate signal for driving a reset gate positioned in an output unit of the image capture device 42, data level sampling and precharge level sampling signals that are supplied to the CDS & AGC 43 for sampling and holding a signal output from the image capture device 42, and signals for synchronizing the analog-to-digital converter 44 and the digital camera processor 45.

Figure 5:
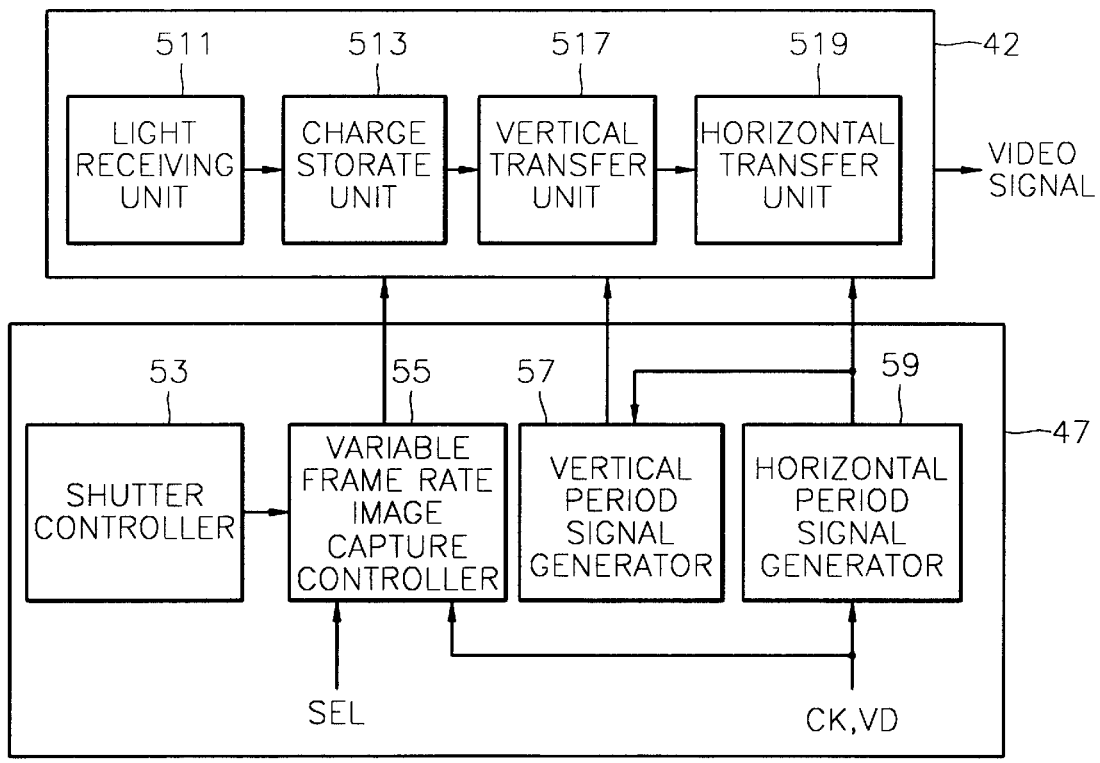
FIG. 5 is a block diagram of an image capture device and associated components according to an embodiment of the present invention.

Referring to FIG. 5, the image capture device 42 includes a light receiving unit 511 for receiving light, a charge storage unit 513, e.g., a photodiode, for converting incident light to charge and for storing the converted charge, and vertical and horizontal transfer units 517, 519 for receiving the charge stored in the charge storage unit 513 and producing video signals therefrom.

The timing signal generator 47 includes a variable frame rate image capture controller 55 for selectively applying gate signals to the image capture device 42 responsive to the vertical drive signal VD and a frame rate select signal SEL. Preferably, the variable frame rate image capture controller 55 generates gate signals for each field defined by the vertical drive signal VD, and applies generated gate signals for selected fields based on the frame rate commanded by the frame rate selection signal SEL to transfer charge stored in the charge storage unit 513 to the vertical transfer unit 517 at the commanded frame rate. The variable frame rate image capture controller 55 also selectively applies shutter discharge pulses to the image capture device 42 based on the commanded frame rate and a shutter control signal generated by a shutter controller 53. The shutter controller 53 may determine a shutter interval in accordance with, for example, exposure parameters such as the luminance of an object being imaged.

A horizontal period signal generator 59 and a vertical period signal generator 57 generate horizontal and vertical period signals to control the horizontal transfer unit 519 and the vertical transfer unit 517 of the image capture device 42. The horizontal period signal generator 59 counts system clock signals to generate signals repeating according to the horizontal period of the video signal. The vertical period signal generator 59 receives the horizontal period signals and counts the number of lines defined thereby, generating a vertical period signal after the count has reach a predetermined number of lines.

Figure 6:
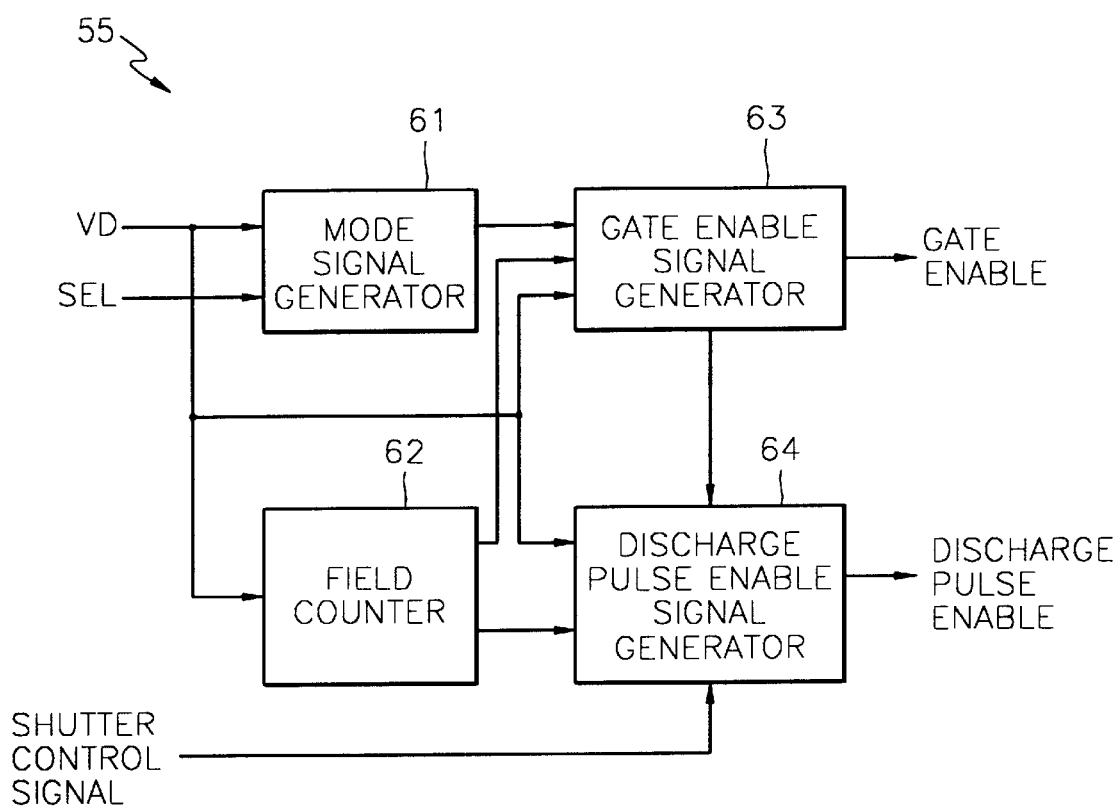
FIG. 6 is a block diagram of a variable frame rate image capture controller according to an embodiment of the present invention.

Referring to FIG. 6, the variable frame rate image capture controller 55 includes a mode signal generator 61 that generates a mode signal responsive to the frame rate selection signal SEL and the vertical drive signal VD. A field counter 62 maintains a count of the number of fields defined by pulses of the vertical drive signal VD. A gate enable signal generator 63 generates a gate enable signal GATE ENABLE responsive to the vertical drive signal VD, the mode signal generated by the mode signal generator 61 and the count of fields maintained by the field counter 62. The gate enable signal GATE ENABLE is used to selectively enable application of the gate signals generated by the variable frame rate image capture controller 55 to the image capture device 42. A discharge pulse enable signal generator 64 generates a discharge pulse enable signal DISCHARGE PULSE ENABLE responsive to the vertical drive signal VD and the count of fields maintained by the field counter 62. The discharge pulse enable signal DISCHARGE PULSE ENABLE is used to selectively enable application of shutter discharge pulses to the image capture device 42 based on the commanded frame rate and the shutter control signal.

The mode signal generator 61 receives the vertical driving signal VD and the frame rate selection signal SEL and generates a mode signal corresponding to the commanded frame rate. The frame rate selection signal SEL preferably commands a rate of 7.5, 10, 12, 15 or 20 frames per second for NTSC, or 6.5, 8, 10, 12.5 or 16 frames per second for PAL. The frame rate selection signal SEL may be produced, for example, from a user-controlled external switch or from a microprocessor.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of operating an image capture device configured to receive read signals and operative to output captured image data responsive thereto, the method comprising the steps of:
   generating a read signal for each of a succession of fields at a field rate;
   receiving a commanded frame rate that is less than the field rate;
   applying selected ones of the read signals to the image capture device based on the commanded frame rate to thereby output image data from the image capture device at the commanded frame rate; and
   shuttering the image capture device for a shutter interval based on the commanded frame rate to prevent image capture during the shutter interval.

2. A method according to claim 1, wherein said step of applying selected ones of the read signals is preceded by the step of generating a count of fields, and wherein said step of applying selected ones of the read signals comprises the step of applying selected ones of the read signals in response to the count of fields meeting a criterion related to the frame rate.

3. A method according to claim 2, wherein said step of applying selected ones of the read signals comprises the step of applying selected ones of the read signals in response to the count of fields equaling the field rate divided by the commanded frame rate.

4. A method according to claim 1, wherein said step of receiving a commanded frame rate comprises the step of receiving a commanded frame rate such that the field rate is an integer multiple of the commanded frame rate.

5. A method according to claim 4, wherein said step of generating a read signal for each of a succession of fields at a field rate comprises generating a read signal for each of a succession of fields at a field rate at a field rate of 60 fields per second, and wherein said step of receiving a commanded frame rate comprises the step of receiving a commanded frame rate of 7.5 frames per second, 10 frames per second, 12 frames per second, 15 frames per second or 20 frames per second.

6. A method according to claim 4, wherein said step of generating a read signal for each of a succession of fields at a field rate comprises the step of generating a read signal for each of a succession of fields at a field rate at a field rate of 50 fields per second, and wherein said step of receiving a commanded frame rate comprises the step of receiving a commanded frame rate of 6.5 frames per second, 8 frames per second, 10 frames per second, 12.5 frames per second or 16 frames per second.

7. A method according to claim 1,
   wherein the image capture device comprises a charge-coupled device (CCD) configured to receive gate signals and operative to output image data responsively thereto;
   wherein generating a read signal for each of a succession of fields at a field rate comprises generating a gate signal for each of a succession of fields at the field rate; and
   wherein said step of applying selected ones of the read signals comprises the step of applying selected ones of the gate signals to the CCD for selected fields of the succession of fields to thereby output image data at the commanded frame rate.

8. A method according to claim 7,
   wherein the CCD is configured to receive a discharge signal operative to discharge an image element in the CCD to prevent image capture; and
   wherein said step of shuttering comprises the step of applying a discharge signal to the CCD to discharge an image element during the shutter interval to prevent image capture during the shutter interval.

9. A method according to claim 8, wherein said step of applying a discharge signal comprise the step of applying a series of discharge pulses to the CCD during the shutter interval to prevent image capture during the shutter interval.

10. A method according to claim 1, wherein the image capture device is configured to receive a shutter control signal and operative to prevent image capture responsive thereto, and wherein said step of shuttering comprises the step of applying a shutter control signal to the image capture device to prevent image capture during the shutter interval.

11. A method according to claim 1, wherein said step of shuttering is followed by the steps of:
   capturing image data in the image capture device; and
   applying one of the selected ones of the read signals to the image capture device for one of the selected fields to thereby output the captured image data.

12. An apparatus for extracting image data from an image capture device configured to receive read signals and operative to output captured image data responsive thereto, the apparatus comprising:
   means for generating a read signal for each of a succession of fields at a field rate;
   means for receiving a commanded frame rate that is less than the field rate;
   means, responsive to said means for generating a read signal for each of a succession of fields and to said means for receiving a commanded frame rate, for applying selected ones of the read signals to the image capture device based on the commanded frame rate to thereby output image data at the commanded frame rate; and
   means, responsive to said means for receiving a commanded frame rate, for shuttering the image capture device during a shutter interval based on the commanded frame rate to prevent image capture during the shutter interval.

13. An apparatus according to claim 12, further comprising means, responsive to said means for identifying a succession of fields, for generating a count of fields, and wherein said means for applying selected ones of the read signals comprises means for applying selected ones of the read signals in response to the count of fields meeting a criterion related to the frame rate.

14. An apparatus according to claim 13, wherein said means for applying selected ones of the read signals comprises means for applying selected ones of the read signals in response to the count of fields equaling the field rate divided by the commanded frame rate.

15. An apparatus according to claim 12,
   wherein the image capture device comprises a charge-coupled device (CCD) configured to receive gate signals and operative to output image data responsively thereto;
   wherein the means for generating a read signal for each of a succession of fields at a field rate comprises means for generating a gate signal for each of a succession of fields at the field rate; and
   wherein said means for applying selected ones of the read signals comprises means for applying selected ones of the gate signals to the CCD for selected fields of the succession of fields to thereby output image data at the commanded frame rate.

16. An apparatus according to claim 15,
   wherein the CCD is configured to receive a discharge signal operative to discharge an image element in the CCD to prevent image capture; and
   wherein said means for shuttering comprises means for applying a discharge signal to the CCD to discharge an image element during the shutter interval to prevent image capture during the shutter interval.

17. An apparatus according to claim 12, wherein the image capture device is configured to receive a shutter control signal and operative to prevent image capture responsive thereto, and wherein said means for shuttering comprises means for applying a shutter control signal to the image capture device to prevent image capture during the shutter interval.

18. An image capture apparatus, comprising:
   an image capture device configured to receive read signals and operative to output image data responsive thereto;
   a timing generator operative to produce a timing signal that defines a succession of fields that occur at a field rate;
   a variable frame rate image capture controller.coupled to said timing generator, configured to receive a commanded frame rate that is less than the field rate, and operative to generate a read signal in each of the succession of fields, to apply selected ones of the read signals.to said image capture device to thereby output image data from said image capture device at the commanded frame rate, and to shutter the image capture device during a shutter interval determined based on the command frame rate.

19. An apparatus according to claim 18, further comprising a field counter coupled to said timing signal generator and operative to generate a count of fields, and wherein said variable frame rate image capture controller is coupled to said field counter and operative to apply selected ones of the read signals in response to the count of fields meeting a criterion related to the frame rate.

20. An apparatus according to claim 18,
   wherein said image capture device comprises a charge-coupled device (CCD) configured to receive gate signals and operative to output image data responsively thereto; and
   wherein said variable frame rate image capture controller is operative to generate a gate signal in each of the succession of fields and to apply selected ones of the gate signals to the CCD for selected fields of the succession of fields to thereby output image data at the frame rate.

21. A method according to claim 20,
   wherein said CCD comprises an image element and is configured to receive a discharge signal operative to discharge said image element to prevent image capture; and
   wherein said variable frame rate image capture controller is operative to apply a discharge signal to said CCD to discharge said image element during the shutter interval to prevent image capture during the shutter interval.

22. An apparatus according to claim 21, wherein said variable frame rate image capture controller is operative to apply a series of discharge pulses to said CCD during the shutter interval to prevent image capture during the shutter interval.

23. An apparatus according to claim 18, wherein said image capture device is configured to receive a shutter control signal and operative to prevent image capture responsive thereto, and wherein said variable frame rate image capture controller is operative to apply a shutter control signal to said image capture device to prevent image capture during the shutter interval.

* * * * *